United States Patent
Muenkel et al.

(10) Patent No.: US 7,853,923 B2
(45) Date of Patent: Dec. 14, 2010

(54) SPECIFIC RUNTIME GENERATORS IN A VISUAL MODELING LANGUAGE ENVIRONMENT

(75) Inventors: Markus Muenkel, Hockenheim (DE); Jade Sripad, Bangalore (IN); Frank Seeger, Wiesloch (DE); Ulf Fildebrandt, Oftersheim (DE); Yuval Gilboa, Pardesiya (IL)

(73) Assignee: SAP AG, Walldorf (DE)

( * ) Notice: Subject to any disclaimer, the term of this patent is extended or adjusted under 35 U.S.C. 154(b) by 1019 days.

(21) Appl. No.: 11/647,638

(22) Filed: Dec. 29, 2006

(65) Prior Publication Data

US 2007/0245319 A1   Oct. 18, 2007

Related U.S. Application Data

(63) Continuation-in-part of application No. 11/323,391, filed on Dec. 29, 2005, now Pat. No. 7,774,745.

(51) Int. Cl.
*G06F 9/44* (2006.01)

(52) U.S. Cl. .................................... 717/106

(58) Field of Classification Search .......... 717/104–109
See application file for complete search history.

(56) References Cited

U.S. PATENT DOCUMENTS

| | | | |
|---|---|---|---|
| 6,968,538 B2 * | 11/2005 | Rust et al. | 717/108 |
| 7,069,254 B2 * | 6/2006 | Foulger et al. | 706/14 |
| 7,421,716 B1 * | 9/2008 | Margulis et al. | 719/331 |
| 7,720,953 B2 * | 5/2010 | Mateescu et al. | 709/223 |
| 7,797,198 B1 * | 9/2010 | Frederick et al. | 705/26 |
| 2006/0265427 A1 * | 11/2006 | Cohen et al. | 707/200 |

* cited by examiner

*Primary Examiner*—Anna Deng
(74) *Attorney, Agent, or Firm*—Mintz, Levin, Cohn, Ferris, Glovsky and Popeo, P.C.

(57) ABSTRACT

Methods and apparatus, including computer program products, for generating runtime entities in a visual modeling environment. Input characterizing an application definition at designtime is received, a determination is made as to whether the designtime entity is to be compiled by a first generator or a second generator, and a runtime version of the designtime entity is generated. The application definition can include a designtime entity and a configuration of properties of the designtime entity. The first generator can support compilation of multiple types of designtime entities and the second generator can support compilation of a specific type of designtime entity. The runtime version can be generated with the second generator if the second generator is to be used or, otherwise, generated with the first generator.

18 Claims, 8 Drawing Sheets

SPECIFIC RUNTIME GENERATORS IN A VISUAL MODELING LANGUAGE ENVIRONMENT

CROSS REFERENCE TO RELATED APPLICATIONS

This application is a continuation-in-part of U.S. patent application entitled "Mapping of Runtime to Designtime in a Visual Modeling Language Environment", filed Dec. 29, 2005, application Ser. No. 11/323,391, now U.S. Pat. No. 7,774,745 the contents of which are hereby fully incorporated by reference.

BACKGROUND

The present disclosure relates to data processing by digital computer in a visual modeling language environment, and more particularly to generation of runtime entities by specific generators in a visual modeling language environment.

Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems. A user interface (UI) is designed to work in concert with application programs, and facilitates interaction between humans and computers by inviting and responding to user input.

A structured approach to developing applications includes a model-driven tool such as VISUAL COMPOSER, which is a visual modeling program manufactured by SAP AG of Walldorf (Baden), Germany (SAP). A tool like the VISUAL COMPOSER allows a developer to compose applications in a flexible way by using patterns. A pattern graphically depicts functional components (e.g., entities of a modeling language) as drag-and-drop services, and a data flow definition between them. A pattern (sometimes referred to as a UI pattern) is a configurable, reusable unit designed to let users accomplish a specific but generically-defined task, such as searching for business objects, and editing the objects that are retrieved. Generally, each pattern has a specific semantic meaning and defined interaction behavior. In some implementations, a pattern can include a predefined arrangement of UI elements. Using patterns promotes uniform design throughout an application or group of applications because similar tasks are represented and handled in the same manner. For example, a user can always search in the same way, whether searching for a sales order, a business partner, or a product. User interface patterns can be defined at various levels, and can be nested within each other, thus creating hierarchies of patterns. At the top level of the hierarchy, a pattern can act as a "floor plan" for a user interface that is designed to help end-users complete a specific business process.

A visual modeling language environment can have a separation between a designtime and a runtime version of an application. A designtime version of an application can include a combination of patterns and configuration of properties of those patterns that can define an application being developed. Underlying a designtime version of an application can be a model of the application, which can be an implementation-independent model (e.g., a model in accordance with a Universal Modeling Language (UML) specification) or a more implementation-specific model (e.g., a model in accordance with a programming language, such as the JAVA programming language from SUN MICROSYSTEMS, INC. of Santa Clara, Calif.). A runtime version of an application can be generated by a visual modeling program based on a designtime version of the application, with the use of a model underlying the designtime version of the application. For example, a designtime version of an application can be used to devise a model with JAVA classes, and, the JAVA classes can be compiled to generate a JAVA runtime version of an application.

SUMMARY

The subject matter disclosed herein provides methods and apparatus, including computer program products, that implement techniques related to generation of runtime entities by specific generators, in a visual modeling language environment.

In one aspect, input characterizing an application definition at designtime is received, a determination is made as to whether the designtime entity is to be compiled by a first generator or a second generator, and a runtime version of the designtime entity is generated. The application definition can include a designtime entity and a configuration of properties of the designtime entity. The first generator can support compilation of multiple types of designtime entities and the second generator can support compilation of a specific type of designtime entity. The runtime version can be generated with the second generator if the second generator is to be used or, otherwise, generated with the first generator.

In another aspect, a first generator can generate multiple types of runtimes entities from multiple types of designtime entities, where the designtime entities correspond to visual modeling language entities modeled by a visual modeling program. In addition, a second generator can generate a runtime entity from a specific type of designtime entity.

In another aspect, a plurality of specific generators can generate runtime entities from respective designtime entities of a visual modeling language environment.

In another aspect, a generator specific to a single designtime pattern entity is encapsulated with the designtime pattern entity in a module capable of being deployed as a single entity. The single entity may be used as a plug-in to a generic generator that can generate runtime entities from multiple types of designtime entities.

The subject matter may be implemented as, for example, computer program products (e.g., as source code or compiled code), computer-implemented methods, and systems.

Variations may include one or more of the following features.

The first generator can be a generic generator (e.g., a pattern-generic generator) and the second generator can be a specific generator (e.g., a pattern-specific generator). Determining whether to use a first or second generator can be performed by the first generator. The first generator can call the second generator to compile the designtime entity if the second generator is to be used.

The second generator may be encapsulated in a pattern component that includes the designtime entity and the second generator (e.g., for deployment and use as a plug-in). The designtime entity can be a pattern component that graphically depicts an entity of a visual modeling language. The pattern component can be a configurable, reusable unit corresponding to a task, and having a specific semantic meaning and defined interaction behavior.

Generating a runtime version of the designtime entity with the second generator can include receiving designtime information related to the designtime entity, and generating the runtime version based on the designtime information. A runtime version of the application definition can include the designtime information and information about the runtime version of the designtime entity.

An architecture of a modeling environment of a visual modeling program can include four layers, including a first layer defining a technical platform, a second layer defining a framework for implementing a modeling language in the technical platform, a third layer defining designtime interfaces for modeling language entities, and a fourth layer defining a layer for configuring the modeling language entities, wherein the designtime entity is implemented in the second layer.

Designtime graphical modeling language entities can be provided for use in a visual modeling program. The designtime graphical modeling language entities can include the designtime entity.

Input characterizing the second generator and an association of the second generator with the designtime entity can be received. The second generator can be registered with the first generator. Determining whether the designtime entity is to be compiled by the first generator or the second generator can include iterating through a table of registered generators and determining whether the designtime entity is associated with the second generator.

The subject matter described herein can be implemented to realize one or more of the following advantages. A designtime entity, such as a pattern, can have a corresponding generator from which one or more runtime entities may be generated, and the generator may be dedicated to generating runtime entities corresponding to that designtime entity. A generator of applications from a visual modeling tool may support integrating with a pattern-specific generator. Advantageously, patterns and corresponding generators may be deployed independently of a generic generator of runtime entities from patterns. For example, a visual modeling tool and generic generator may be developed by a first-party developer and a third-party developer may develop a pattern and a corresponding specific generator for the pattern, and provide the pattern and pattern-specific generator to customers of the visual modeling tool package. Support for pattern-specific generators can allow for better generators for certain patterns to be developed. Pattern-specific generators may allow for an approach to modeling that provides a clean componentization, in that the pattern components can have a direct representation not only in designtime and runtime, but also in the generator.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
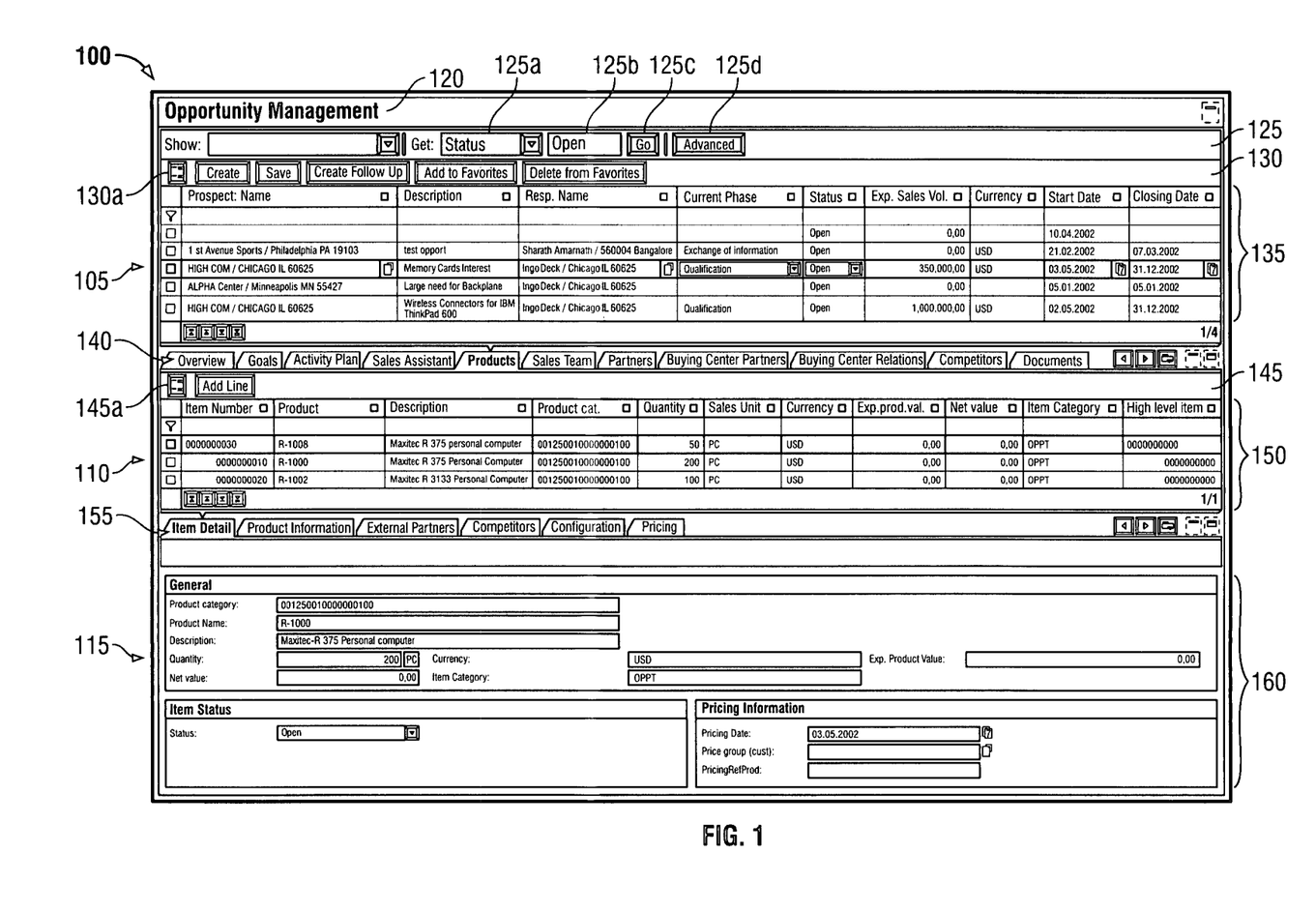
FIG. 1 is a screenshot of a user interface.

FIG. 1 illustrates a screenshot of a user interface 100. User interfaces typically contain various UI elements, including controls (e.g., drop down element 125a, text box element 125b, or button element 125c) and data elements (e.g., content area 135), arranged into application screens or views. The design of a user interface, including the layout of the UI elements and the navigation between the UI elements and between the views, is usually left up to the application developer. Thus, if the task of developing the same application is given to a number of application developers, each developer may design a different user interface for that application. Although each version of the application implements the same functionality, the user interfaces may be significantly different from each other.

As an example use of patterns, a floor plan for a user interface can specify that an application screen is to be divided into three sections, with a top section for searching for and selecting business objects, a middle section for showing the details of an object selected in the top section, and a bottom section for showing the details of a sub-object of the object in the middle section. More detailed, lower-level patterns can be used for each of the sections specified in a floor plan. For example, that a section of the screen is to include a search bar with various text entry fields and buttons at the top, and an area below the search bar where content (i.e., the content returned as a result of a search) is to be displayed. This process can continue with the definition and hierarchical nesting of even lower-level patterns.

The user interface 100 shown in FIG. 1 illustrates an example of a pattern-based user interface. The user interface 100 has a floor plan that includes an object identification pattern (OIP) 105 and two object data patterns (ODPs) 110 and 115. Object identification pattern 105 and object data patterns 110 and 115 are made up of embedded lower-level patterns, such as a data view, a form pane, a list pane, or a chart pane. Each embedded pattern can include further embedded patterns, including, for example, tool bars, tables, tab strips, and other UI pattern elements. Object identification pattern 105 is a pattern that provides an interface for searching for objects (using zero or more selected criteria), and for displaying objects found to meet those criteria. Like the floor plan pattern, OIP 105 is itself a pattern with several embedded elements. Object identification pattern 105 includes a title bar 120, a search bar 125, a tool bar 130, and a content area 135.

Figure 2:
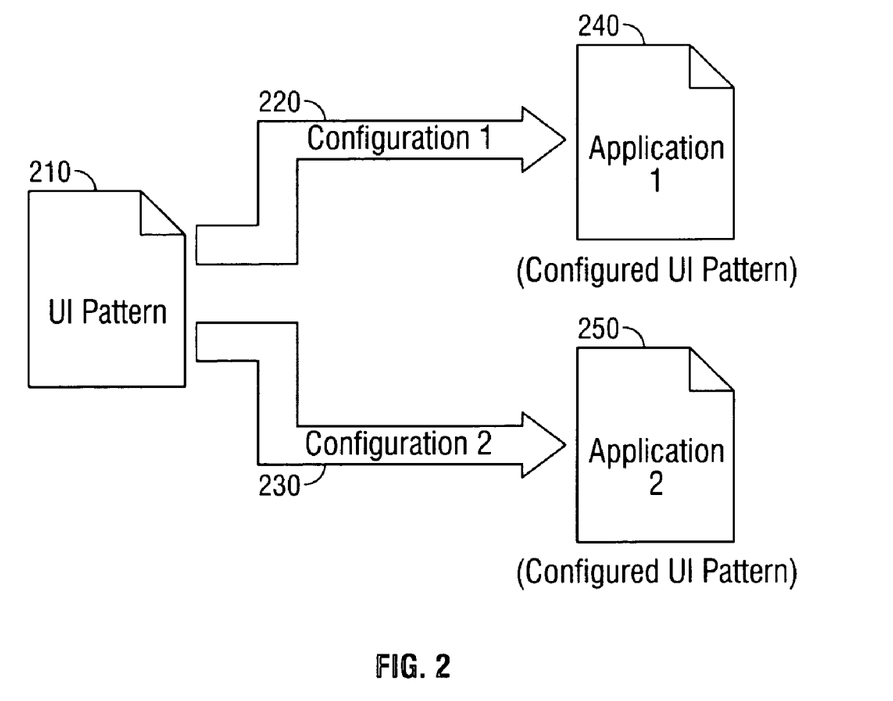
FIG. 2 is a block diagram illustrating the configuration of a UI pattern.

User interface 100 of FIG. 1 illustrates a particular application that is based on the patterns described above. Such an application can be referred to as a pattern-based application, a pattern application, or simply an application. As explained above, UI patterns are reusable user interface units designed for generic tasks—for example, an OIP pattern is designed for the task of searching for and selecting business objects stored in a back-end system (e.g., a database). In order to create a concrete user interface, e.g., user interface 100 with OIP 105, UI patterns need to be configured. FIG. 2 illustrates an example in which a UI pattern 210 is configured (shown using arrows 220 and 230) to create two UI applications 240 and 250. Configuration one 220 is used to create application one 240, and configuration two 230 is used to create application two 250.

Configuration is the process through which a UI pattern is developed into an actual user interface (or portion thereof) for an actual application. For illustrative purposes, this might be compared to instantiating an object of a specified class—the UI pattern (comparable to a class) specifies the general properties of a portion of a user interface, and a configured pattern (comparable to an instantiated object) specifies the actual properties of the portion of the user interface for an actual application. UI pattern 210 represents the general properties of the UI portion—for example, that a table is included in that UI portion, and that the location of the table is under a title bar. Configuration one 220 represents the process of specifying properties of the UI portion (for example, the specific columns that will be included in the table when the table is rendered), so as to create an application (for example, application one 240) that displays a UI with a table under the title bar with specific columns defined by configuration one 220. Similarly, application two 250 displays a table, but with specific columns as defined by configuration two 230.

A configuration can also specify what back-end systems and data are to be used for a pattern. For example, configuration one 220 can specify a particular back-end system (e.g., a local or remote database system) and a particular service to use to access the data on that back-end system that is to be displayed in the table in the UI pattern 210. Examples of services that can be used to access a host system include web services, ENTERPRISE JAVA BEANS (EJBs), Business Application Programming Interfaces (BAPIs) developed by SAP, and other business logic services.

As another example of a configuration, an OIP might specify that a user interface is to include a search bar at the top of the interface and a content area below the search bar. The search bar is to include a drop down box for selecting a search field, a text box for entering a query string, and a "Go" button for executing searches. Configuring such a pattern is the process of providing specifics for the pattern for an actual application. For example, to configure the OIP pattern, an application developer can specify the search fields to be included in the drop down box, the query to run when the "Go" button is pressed, the back-end system in which to run the query (i.e., the system where the actual data is located), and the columns from the returned results to display in the content area.

In some implementations, a UI pattern can have a number of predefined layouts (e.g., a grid layout and a flow layout), and the application developer can decide which of the available layouts to use as part of the configuration process. Moreover, each layout can be further configurable, providing the application developer with further configuration options (e.g., an option to create groupings of fields or other elements). In yet other implementations, a pattern can be defined to have a fully configurable layout, giving the application developer complete freedom to modify the arrangement of the elements in the pattern (e.g., by using a graphical configuration tool to specify screen positions for each element in the pattern).

Thus, the degree to which each UI pattern is configurable can vary. For example, the degree to which the arrangement of elements in a pattern can be configured can vary across a spectrum—for some patterns, the arrangement of UI elements can be fully predefined, leaving no configuration options for the application developer; for some patterns, the application developer can be given an option to choose between a handful of predefined arrangements; and for other patterns, the application developer can be given full freedom to define a custom arrangement of elements.

Other pattern properties can also be partially or fully configurable. For example, a developer can be given no options or a few options regarding the actions to be performed by a UI element in a pattern. Or the developer can be allowed to define and associate a custom action with an element in a pattern.

As can be seen from the prior discussion, the term "configuration" can be used in multiple ways. First, "configuration" is the process by which a pattern is developed into a concrete user interface (or portion thereof) for a concrete application. A "configuration" also refers to the data that is produced as a result of the configuration process—i.e., it is the set of data that defines a concrete user interface based on a pattern. Finally, "configuration" can also be used to refer to the set of options provided during the configuration process. As used in this manner, a selected option in a configuration produces a defined item of configuration data.

The use of patterns to develop applications creates two potential levels of re-use. First of all, patterns serve as re-usable building blocks for building user interfaces. For example, an OIP can be used to create two different user interfaces—a first configuration can define a user interface for searching for business objects related to customers (customer objects), and a second configuration can define a second user interface for searching for business objects related to inventory (inventory objects).

In addition, configurations can be reused, meaning that the configurations themselves can serve as re-usable building blocks for building applications. Thus, in the example above, the OIP configuration that defines a user interface for searching for customer objects can be integrated and used in two different applications (e.g., a customer relationship management application and a billing application).

The configuration of a UI pattern can be done through the use of a configuration application, such as a visual modeling program. A configuration application facilitates the process of configuring a UI pattern. In one implementation, the configuration application displays multiple configuration options for the application developer to select. The configuration options can include lists of the available back-end systems, queries, query fields, and query results.

Selections of configuration options can be stored as configuration data for a UI pattern. The configuration data can include associations between one or more of the UI elements in the UI pattern and one or more of the back-end entities to be used with the UI pattern. As an example, configuration data for the OIP described above can include a specification of the back-end system to be used, the query to be run in the back-end system, the query fields to show in the drop down box, and the result fields to display in the content area.

Configuration data can also include customization data for one or more of the UI elements in a UI pattern. Customization data can specify local changes to the business objects associated with the UI elements. For example, a drop-down menu item might be associated with a back-end query field called "UID". The customization data may specify that the "UID" field should be displayed using a more user-friendly label, for example, "reference number". Such a customization applies only to the particular UI element in the particular application being configured, and does not affect how the business object is represented in the back-end system or how the business object is represented by other UI elements in other applications that use the same UI pattern.

The configuration data can be stored in a configuration repository. In one implementation, the configuration data is stored in one or more files. Such files can be nested to reflect a hierarchical arrangement of further UI patterns. The configuration data can then be read by a pattern component, which generates the implementation of the actual user interface for the application based on the configuration data.

Figure 3:
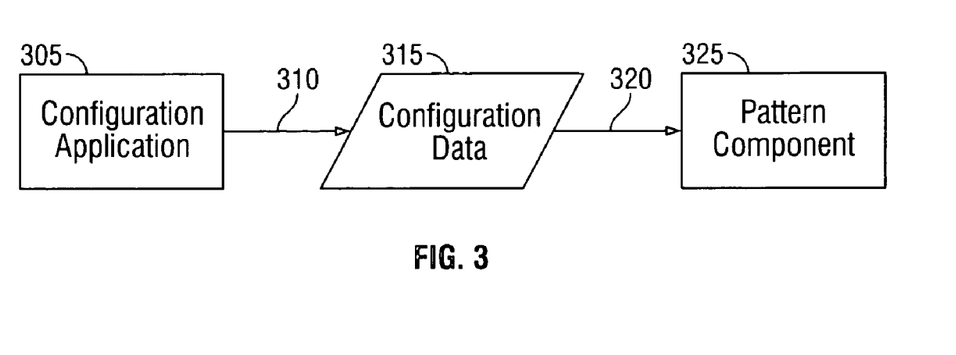
FIG. 3 is a block diagram illustrating the use of a configuration application.

FIG. 3. illustrates the use of a configuration application 305 to create 310 configuration data 315, which is combined 320 with a UI pattern component 325 to produce a pattern-based application. The configuration application 305 generates configuration data 315 that is specific to pattern component 325. That is, the configuration application 305 can ensure that a configuration schema for pattern component 325 is followed.

The generation of a pattern-based application based on a configuration can be done either immediately after the configuration has been completed, or at a subsequent point in time, such as when the pattern-based application is executed.

Figure 4:
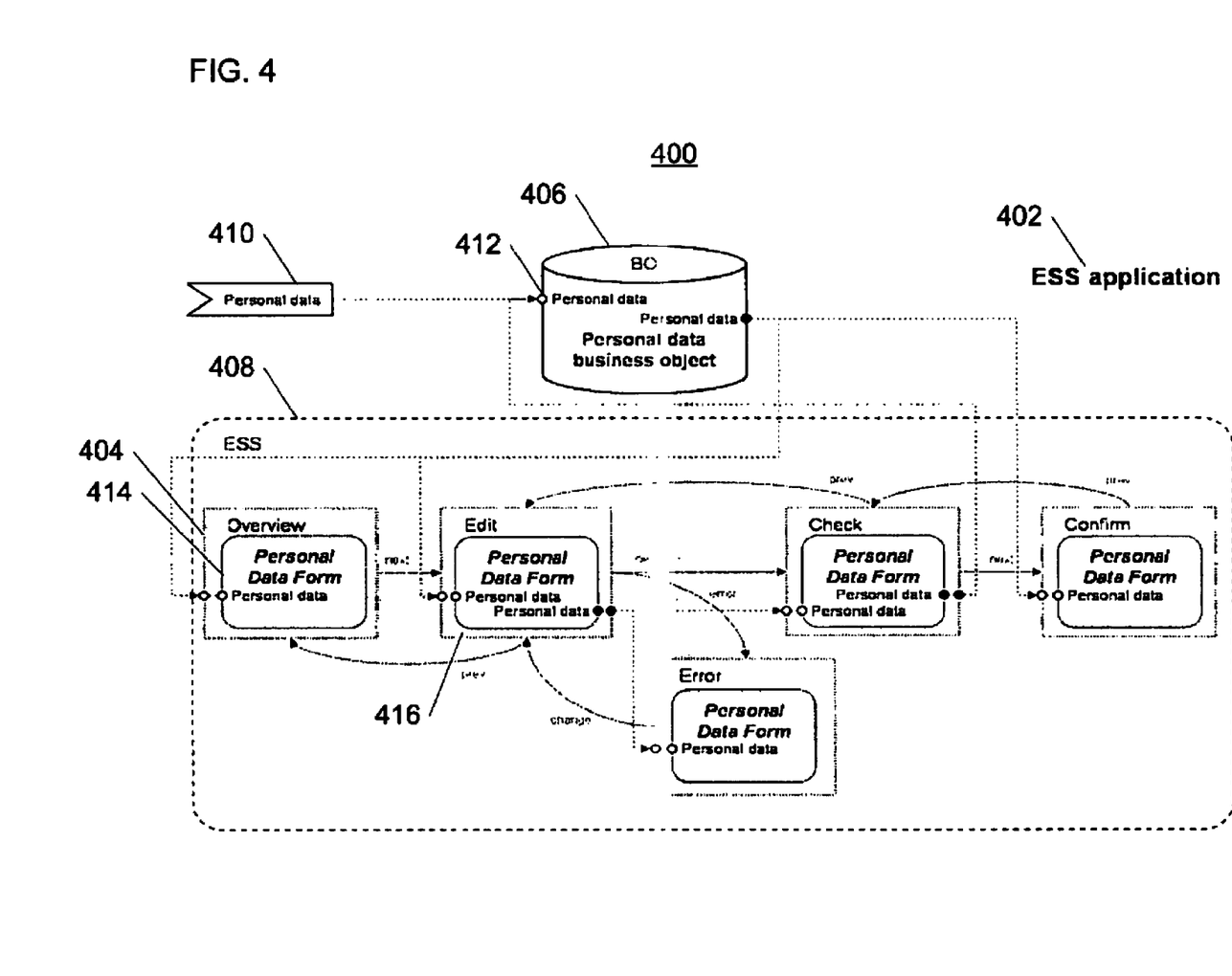
FIG. 4 is an illustration of an application being developed is a visual modeling program.

FIG. 4 is an illustration 400 of an application being developed is a visual modeling program. The illustration 400 is a graphical representation of an ESS (Employee Self-Services) application 402 in a visual modeling program. The visual modeling program allows users to generate applications based on a combination of patterns (graphical representations of entities for an application being developed). The visual modeling program includes a set of patterns that are provided to a user and define entities of a composition language. The composition language defines how applications can be developed in the visual modeling program. Thus, the base set of patterns can be considered building blocks for developing an application in the visual modeling program.

In the composition language, there are different types of entities that have different semantics and syntax, as represented by different patterns and types of patterns in a visual modeling program. The illustration 400 includes several different types of patterns, including patterns for scenarios, services, states, ports, plugs, and interactors (i.e., different patterns for different types of entities, including scenarios, services, etc.). Scenarios, such as the Overview scenario 404, are entities that represent a reusable user interface unit of an application being developed (e.g., a tab in a user interface of a web application). Services, such as the BO service 406, are entities that need not have a visual representation in an end-user application (e.g., in an application developed in the visual modeling program) and provide data to other components of an end-user application (e.g., a service that, in response to receiving a selection of personal data as search criteria, outputs personal data matching the search criteria). States, such as the ESS state 408, define visual states of a scenario by defining elements that are visible to an end-user of an application being developed (e.g., by encapsulating scenarios to be displayed). Ports, such as the Personal data port 410, can be connection points to and from entities in the modeling language (e.g., a connection point between a service and an interactor). Plugs, such as the Personal data plug 412, can be external representations of ports of a component (e.g., if the BO service 406 were drilled down, the Personal data plug 412 can be a port). Interactors, such as the Personal Data Form interactor 414, can be an atomic unit of user interaction (in the visual modeling program, such that the visual representation can not be drilled down to another level of entities), where an interactor can obtain and provide data by transforming input data into output data based on user interaction (e.g., the interaction of an end-user of an application being developed) (e.g., an interactor can be a form).

In the composition language, as reflected in a visual modeling program, the different types of entities have a different type of corresponding graphical representation. For example, interactors can have a graphical representation of a box defined by solid lines and rounded corners. As another example, a service can have a corresponding graphical representation of a cylinder.

The composition language can be defined to include certain entities that have associated semantics and syntax. For example, the composition language can be defined to include the Overview scenario 404 and the Edit scenario 416, each of which can have different semantics and different syntax, as defined by the composition language. The entities defined by the composition language can be referred to as base entities. These entities can be understood by the visual modeling program such that the visual modeling program can generate an associated runtime version of the entities. For example, by having a special generator that interprets Edit scenarios, a special generator can generate a runtime version of the Edit scenario 416.

Although certain types of entities are discussed with reference to FIG. 4, additional, different, or fewer entities can be used in a visual modeling program to represent different semantics and syntax of components of an application being developed.

Figure 5:
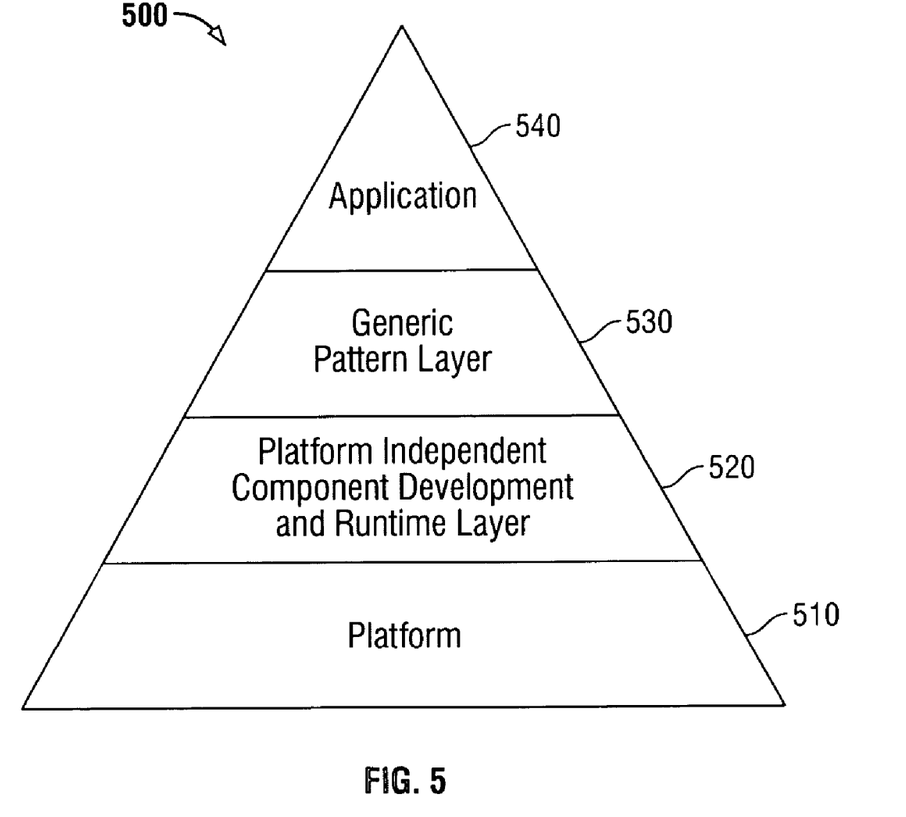
FIG. 5 is a block diagram of a framework for simplifying application development.

FIG. 5. illustrates an example framework 500 for application development based on the configuration of patterns. At the base, framework 500 includes a platform layer 510 on which applications execute. Two example platform layers 510 are the JAVA 2 PLATFORM, ENTERPRISE EDITION (J2EE), manufactured by SUN MICROSYSTEMS and the ADVANCED BUSINESS APPLICATION PROGRAMMING (ABAP)-based platform manufactured by SAP. The platform layer is generally chosen (or already established) by the enterprise that executes the applications and can be referred to as the technical platform layer.

To enable applications to execute on different platform layers 510, framework 500 includes a platform independent component development and runtime layer 520. In this environment, applications can be developed using modules known as components. Components can be stored in a component repository and reused—that is, each component can have more than one instance, where the component instances are used in multiple applications, or multiple times in the same application. Components can be embedded (nested) within other components, and they can have zero or more visual representations. In one implementation, each component provides three separate interfaces—a programming interface, a data binding interface, and a visual interface. The programming interface can be used by an embedding entity (a component embedder—e.g., a higher level component, or an application) to interact with the embedded component. The visual interface can be used by a component embedder to access and use the visual representations of the embedded component (for example, to form the component embedder's own visual representation). The data binding interface can be used by the component embedder to exchange data with the embedded component.

The combination of components in the platform independent component development layer 520 can be referred to as a framework layer as it can provide a framework for interfacing between patterns in the pattern layer 530 and the technical platform in the platform layer 510. By defining this interface, the platform independent component development layer 520 can be used to define an implementation of a modeling language for a technical platform (e.g., a translation of entities of a model to runtime entities; whereas the pattern layer 530 provides designtime interfaces (e.g., patterns) for the modeling language entities).

In one implementation, platform independent layer 520 provides a framework for defining application components in a declarative and/or graphical manner, without needing to program the components for a particular platform layer 510. Platform independent layer 520 also provides interfaces, tools, services, and other features to enable the application components to execute on a specific platform layer 510. In another implementation, platform independent layer 520 additionally provides functionality to enable application components to render user interfaces on a number of different clients, with platform independent layer 520 performing the appropriate transformations for specific clients.

Building on top of platform independent layer 520, framework 500 includes a pattern layer 530 with one or more generic UI patterns. Each UI pattern is generic because it defines a particular pattern (e.g., a floor plan pattern, an OIP, an ODP, a GDP, and the like), but not the specific content that is included for a specific application that uses that pattern. The specific content for a specific application is created by configuring the pattern.

The top layer, application layer 540, contains the actual applications to be run by end-users. In this framework, an end-user application is made up of one or more configured UI patterns. In an implementation where each UI pattern includes a pattern component, an end-user application is made up of one or more configured pattern components (e.g., pattern components and their corresponding configurations). An end-user application can be stored in a configuration repository in the form of configuration data and references to the associated pattern components.

Framework 500 thus enables application developers to develop applications by configuring generic pattern components into components for specific applications (e.g., components that display the actual fields illustrated in UI 100). In one implementation, as described in more detail below, configuration data (e.g., data in a configuration repository or in one or more configuration files) is used to configure a generic pattern component into a component for a specific application. The configuration data can be defined through the use of declarative and/or graphical tools that are included, for example, in a configuration application, thus dramatically simplifying the task of developing applications. If, for example, the configuration application has access to a meta data repository that specifies the fields available for a particular back-end system for which an application is being developed, the application developer can develop an application (e.g., create a configuration) by simply choosing the fields in the meta data repository to be included (e.g., displayed) in the application.

Framework 500 can be thought of as creating a role-based programming methodology, where layers 510, 520, 530, and 540 correspond to different roles for different developers. Framework 500 is illustrated as a triangle to represent graphically that complexity and difficulty decrease for each role as one moves from the base layer to the top layer. Thus, a developer who is responsible for building and maintaining the platform independent layer 520 has the most complex and difficult job, and must be familiar with the programming languages, tools, and other intricacies of one or more platform layers 510. A developer who is responsible for building and maintaining UI patterns (e.g., configuration applications and pattern components) has a simpler job, as he or she can take advantage of the features and functionality offered by the platform independent layer 520, as described above. Finally an application developer (a developer who is responsible for developing end-user applications) has the least complex job, as he or she can create applications simply by configuring predefined UI patterns. Where the configuration process is as simple as using a configuration application to choose the desired fields from a set of available fields, the application developer need not have advanced programming skills.

Figure 6:
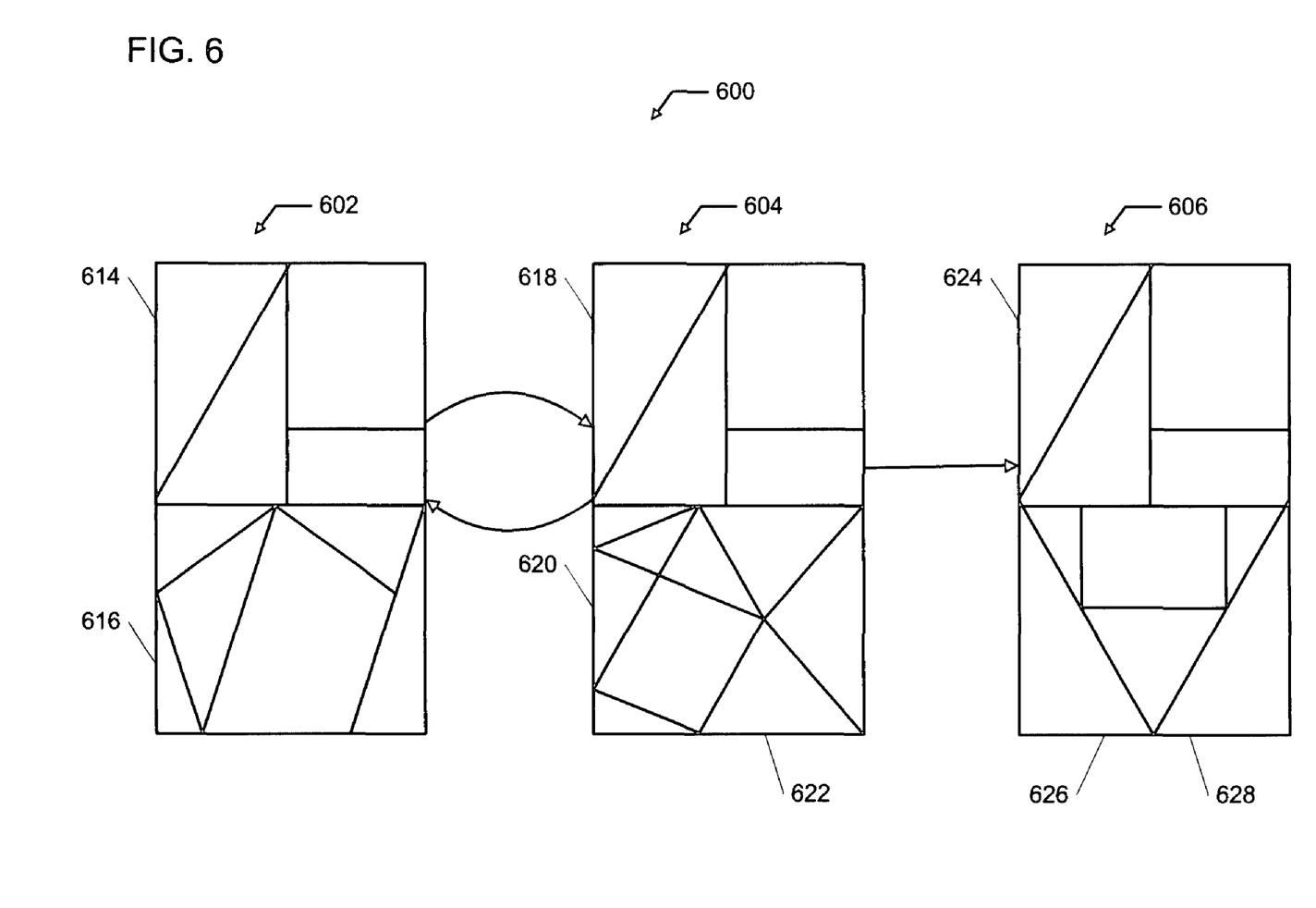
FIG. 6 is a diagram of different versions of an application in a visual modeling language environment.

FIG. 6 is a diagram 600 of different versions of an application in a visual modeling language environment. The diagram includes a runtime version 602 of an application, a version of the application as a model 604, and a designtime version 606 of the application. In general, a designtime version of an application represents the version of an application with which a user interacts to develop the application, whereas, a model can represent a platform independent expression of entities that correspond to the designtime version of the application. And, a runtime version of the application can be a version of the application which can be generated for a platform such that the application can execute on that platform (e.g., a platform-specific executable version of an application).

The diagram 600 represents how entities with a same or similar functionality can differ across different versions of an application. In the diagram 600, each of the versions of the application have a different breakdown of entities, as represented by the different shapes and sizes of shapes that make up each of the versions of the application. For example, the designtime version 602 has a small triangle 616 that represents an entity that is the same as the combination of entities that are represented by the triangles 620 and 622 in the model 604 of the application. Also, the combination of triangles 626, 628 of the runtime version 606 are differently shaped and sized from the combination of triangles 620, 622 of the model 604, although the combinations represent entities that, when combined, have the same functionality. For example, the small triangle 616 of the designtime version of the application can represent a search form (e.g., a designtime entity being a form for composing a search of a data source) of an application, and the combination of the entities represented by the triangles 620, 622 of the model 604 can represent a model version of the search form (e.g., a JAVA class for receiving a search request and a JAVA class for performing searches).

The diagram 600 can represent relationships involved in generating runtime entities of an application. For example, based on a selection in the designtime environment 602 of the entity represented by the small triangle 616, an associated one or more model entities, which represent the same or similar semantics and syntax, can be selected for use in the model 604 representation. For example, a user of a visual modeling program can select a search form designtime entity and the visual modeling program can select UML classes that represent the same or similar functionality as the search form. Based on the model entities, runtime entities can be generated. For example, based on the model entities represented by the triangles 620, 622 of the model 604, a visual modeling program can generate runtime entities, as represented by the triangles 626, 628 in the runtime version 606 of the application. For example, a compiler can generate platform-specific executable code based on a platform-independent model.

Figure 7:
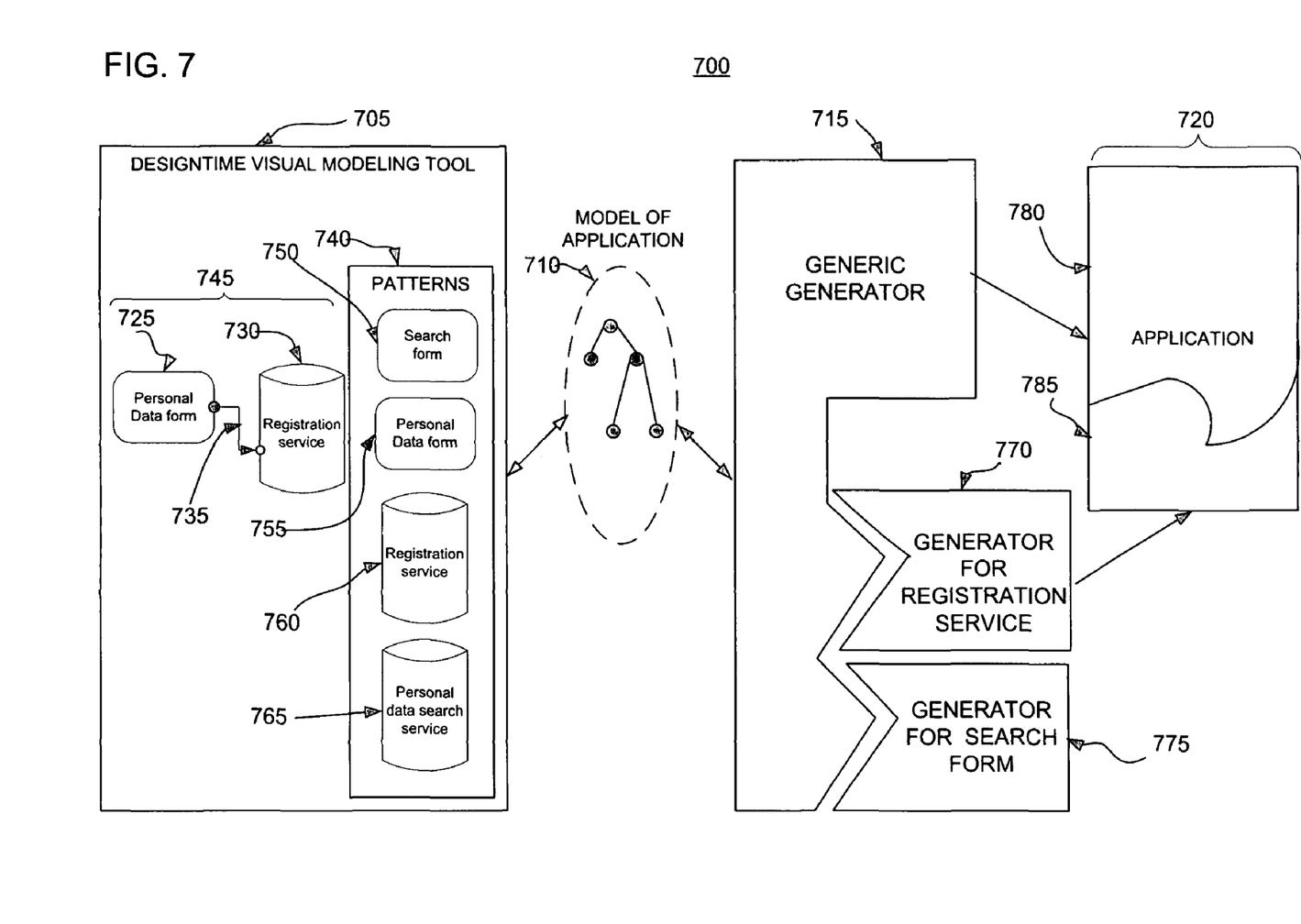
FIG. 7 is a diagram of components used to design and generate an application.

FIG. 7 is a diagram 700 of components used to design and generate an application 720. The components include a designtime visual modeling tool 705, a model of the application 710, a generic generator 715, and specific generators 770, 775. In general, a user can model an application in the visual modeling tool 705 using patterns 740. By dragging and dropping the patterns into a work area, and configuring the patterns, an application can be designed. For example, a designtime version of an application 745 can result from dragging and dropping the personal data form pattern 755 and the registration service 760. The patterns can be configured by creating a link 735 between plugs of the personal data form instance 725 and the registration service instance 730. In addition, properties can be configured though a dialogue box (not shown; e.g., a wizard). From the designtime version of the application 745, a model of the application 710 can be generated (e.g., similar to the model 604 of the application of FIG. 6). Then, from that model, a runtime version of the application 720 can be generated by a combination of the generic generator 715 and the specific generators 770, 775.

The patterns 740 that are available to generate a designtime version of an application 745 can include patterns that have a corresponding specific generator and patterns that can be generated by a generic generator. The specific generator can be specific in the sense that for every instance of a pattern in a designtime version of an application, the specific generator can be used to generate a corresponding runtime entity. For example, a search form pattern 750 can have a corresponding specific generator 775 that generates search form runtime entities based on the search form pattern 750. Patterns that do not have a corresponding (e.g., associated) specific generator can be generated by a generic generator. The generic generator 715 can be generic in the sense that multiple types of patterns can be supported by the generic generator 715. For example, the generic generator 715 can support generating runtime entities for the personal data form pattern 755 and the personal data search service 765.

To generate the application 720 from the model 710 of the application, the generic generator can interpret the model 710 to determine whether a runtime entity is to be generated by the generic generator 715 or one of the specific generators 770, 775. This determination can include, as examples, looking in a table of registered specific generators to determine if a specific generator exists for a designtime entity (e.g., a pattern), searching a directory of plug-ins to determine if a specific generator exists, determining if the designtime entity is associated with the generic generator, and the like.

If a specific generator is determined to exist for a designtime entity, the generic generator can call the specific generator to generate a corresponding runtime entity. Otherwise, the generic generator can generate a runtime entity. For example, the generic generator 715 can determine that the personal data form pattern 725 does not have a corresponding specific generator, so the generic generator 715 can generate a runtime entity 780 of the application 720 that corresponds to the personal data form pattern 725. As another example, the generic generator 715 can determine that the registration service pattern 730 has a corresponding specific generator 770, and the specific generator 770 can be used to generate a corresponding runtime entity 785.

The generic and specific generators can generate runtime entities in a same or similar fashion (e.g., using same types of input to generate output, compiling, and the like); however, the encapsulation of generating the runtime entities from different generators can be advantageous. For example, a new pattern can be designed and a corresponding specific generator can be packaged with the new pattern. As a previously designed generic generator might not support generating one or more runtime entities based on the pattern, the specific generator can be used. As another example, if an improved technique for generating a runtime entity is designed, a specific generator can be used to replace a generic generator's support for generating the runtime entity. Generating runtime entities can include compiling a pattern definition in a modeling language (e.g., with a corresponding configuration of properties).

Runtime entities generated by the generic generator 715 and the specific generators 770, 775 can be linked together by the generic generator 715, or, they can be implicitly linked together by the respective generators. For example, properties of the designtime entities can include references to other designtime entities. When the designtime entities are compiled to runtime entities, the properties can be handled by respective generators, such that coordination between generic and specific generators need not occur. For example, the link 735 between the personal data form pattern 725 and the registration service pattern 730 can be reflected by a property of the personal data form pattern 725 that indicates its plug is connected to a first instance of a registration service and a property of the registration service pattern 730 can indicate that it's plug is connected to a first instance of a personal data form pattern. The generic generator and the specific generator 770 can generate JAVA objects that include properties that reflect the properties of the plugs such that, when executed, a connection between the objects exists.

In variations, fewer, additional, or different components can exist. For example, there can be multiple generic generators that generate multiple types of patterns. As another example, any number of specific generators can exist, or none can exist at all and a generic generator can simply be capable of interfacing with a specific generator. As another example, the generic generator 715 need not interact with the specific generators 770, 775 to generate an application. For example, another module can exist and that module can manage the generic generator 715 and the specific generators 770, 775. As another example, designtime entities that are more primitive than a pattern can exist and the designtime visual modeling tool 705 can support freestyle design in addition to pattern-based design. As another example, although a specific generator can exist for a designtime entity, the specific generator need not be used all the time. For example, a specific generator can be able to only generate runtime entities for a designtime entity on a specific platform and a generic generator can be used to generate runtime entities for that designtime entity for other platforms. In variations, a specific generator can exist for each pattern component, and a generic generator need not exist.

Figure 8:
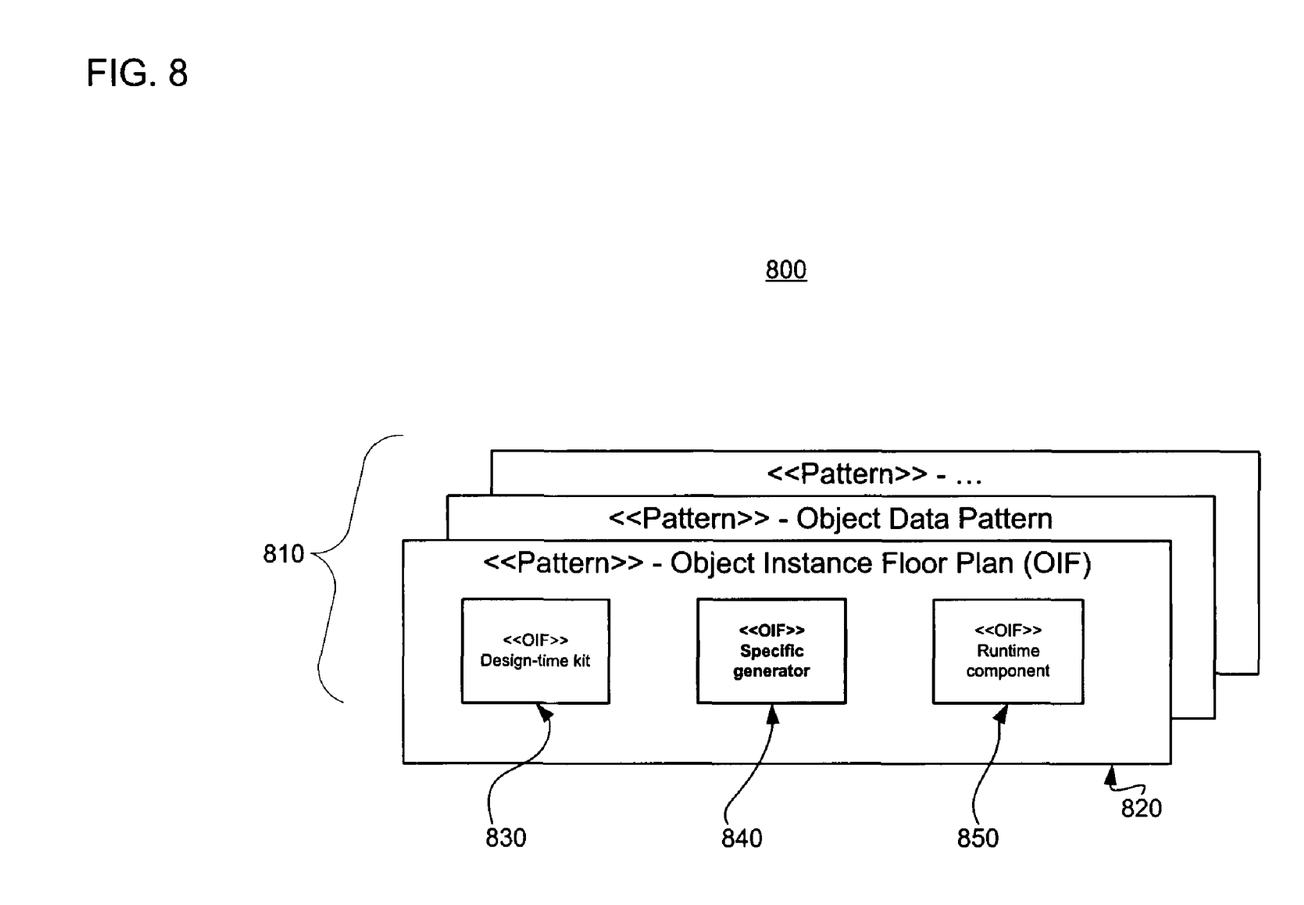
FIG. 8 is a diagram of patterns including specific generators.

FIG. 8 is a diagram 800 of patterns 810 including specific generators. The patterns 810 include designtime versions of the patterns, specific generators and runtime components. For example, the Object Instance Floor Plan (OIF) pattern 820 includes a designtime version of the pattern 830, which is a designtime kit; a specific generator 840; and a runtime component 850. FIG. 8 illustrates that a pattern can include specific generators such that a deployment of a pattern can be self-contained. For example, the OIF pattern 820 can be deployed at a visual modeling tool such as the visual modeling tool 705 of FIG. 7, and the visual modeling tool can use the included specific generator 840 to generate runtime entities that correspond to the designtime entity 830. The runtime component 850 is included in the diagram 800 to illustrate that a specific OIF runtime component can be generated based on the designtime entity 830. As deployed, a pattern can simply include a designtime entity and a corresponding specific generator (or, they may be deployed separately, or with additional components). Advantageously, pattern-specific generators enables development, packaging, shipment and maintenance of a set of completely self-contained patterns.

Figure 9:
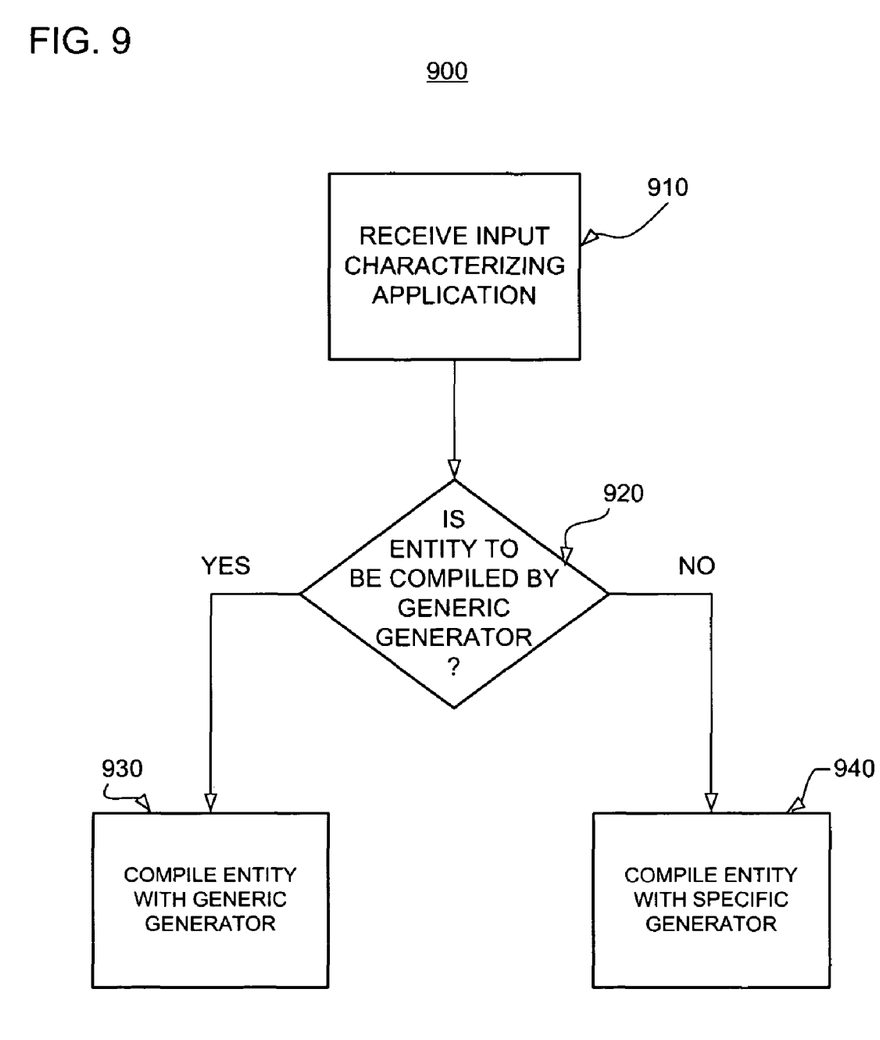
FIG. 9 is a flowchart illustrating generation of a runtime entity that may be compiled with a generic or specific generator.

FIG. 9 is a flowchart 900 illustrating generation of a runtime entity that may be compiled with a generic or specific generator. The flowchart 900 can be a depiction of operations performed by the generic generator 715 and the specific generators 770, 775 of FIG. 7. In general, a runtime entity can be generated by a generic or specific generator, and, the runtime entity can be part of an application.

Input characterizing an application is received (910). The input can include a combination of designtime entities, as examples, as a model in accordance with a modeling language that is received at a generic generator or as input to a visual modeling tool. In addition, the input can include a configuration of properties for the designtime entities. As examples, properties can include a description of how a runtime entity is to be displayed in a graphical user interface, a name of an entity, a description of a link to other entities, and the like.

A determination is made as to whether an entity (e.g., a designtime entity) is to be compiled by a generic generator (920). The determination can be made by a generic generator that provides a framework from which specific generators are called, or a module that manages a generic generator and specific generators. The determination can involve, as examples, looking up a table to determine whether a designtime entity is associated with a generic or specific generator (e.g., specific generators can be registered in a program for designtime entities), determining if a specific generator exists for a designtime entity (e.g., by looking through a list of specific generators), determining if a generic generator supports compiling the designtime entity (e.g., to determine that the generic generator is to be used), and the like.

If the entity is to be compiled by a generic generator, the entity is compiled with a generic generator (930); otherwise, the entity is compiled with a specific generator (940). To generate the entity, as an example, a generator can compile source code corresponding to a designtime entity with properties corresponding to the designtime entity (e.g., based on the input characterizing the application received at 910). A specific generator can be called by a generic generator.

A runtime version of an application can be generated by compiling designtime entities with a corresponding generic or specific generator, such that an aggregation of the runtime entities is the application.

In variations, additional, different, or fewer operations can be performed to generate an application. For example, visual modeling languages entities can be provided with a visual modeling program.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product, tangibly embodied in a non-transitory computer-readable medium, the computer program product being operable to cause data processing apparatus to perform operations comprising:
   receiving input characterizing an application definition at designtime, the application definition comprising a designtime entity and a configuration of properties of the designtime entity;
   determining whether the designtime entity is to be compiled by a first generator or a second generator, the first generator supporting compilation of multiple types of designtime entities and the second generator supporting compilation of a specific type of designtime entity;
   receiving input characterizing the second generator and an association of the second generator with the designtime entity;
   registering the second generator with the first generator; wherein
      determining whether the designtime entity is to be compiled by the first generator or the second generator comprises iterating through a table of registered generators and determining whether the designtime entity is associated with the second generator, and
      the determining is performed by the first generator and the operations further comprise the first generator calling the second generator to compile the designtime entity if the second generator is to be used; and
   generating a runtime version of the designtime entity, the runtime version generated with the second generator if the second generator is to be used or, otherwise, generated with the first generator.

2. The computer program product of claim 1, wherein the second generator is encapsulated in a pattern component comprising the designtime entity and the second generator.

3. The computer program product of claim 1, wherein the designtime entity is a pattern component that graphically depicts an entity of a visual modeling language.

4. The computer program product of claim 3, wherein the pattern component is a configurable, reusable unit corresponding to a task, the pattern component having a specific semantic meaning and defined interaction behavior.

5. The computer program product of claim 1, wherein generating a runtime version of the designtime entity with the second generator comprises:
   receiving designtime information related to the designtime entity; and
   generating the runtime version based on the designtime information; and the operations further comprise:
   including in a runtime version of the application definition the designtime information and information about the runtime version of the designtime entity.

6. The computer program product of claim 1, wherein an architecture of a modeling environment of a visual modeling program comprises a first layer defining a technical platform, a second layer defining a framework for implementing a modeling language in the technical platform, a third layer defining designtime interfaces for modeling language entities, and a fourth layer defining a layer for configuring the modeling language entities, wherein the designtime entity is implemented in the second layer.

7. The computer program product of claim 1, wherein the operations further comprise:
   providing designtime graphical modeling language entities for use in a visual modeling program, wherein the designtime graphical modeling language entities comprise the designtime entity.

8. A computer-implemented method comprising:
   receiving input characterizing an application definition at designtime, the application definition comprising a designtime entity and a configuration of properties of the designtime entity;
   determining whether the designtime entity is to be compiled by a first generator or a second generator, the first generator supporting compilation of multiple types of designtime entities and the second generator supporting compilation of a specific type of designtime entity;
   receiving input characterizing the second generator and an association of the second generator with the designtime entity;
   registering the second generator with the first generator; wherein
      determining whether the designtime entity is to be compiled by the first generator or the second generator comprises iterating through a table of registered generators and determining whether the designtime entity is associated with the second generator, and
      the determining is performed by the first generator and the operations further comprise the first generator calling the second generator to compile the designtime entity if the second generator is to be used; and
   generating a runtime version of the designtime entity, the runtime version generated with the second generator if the second generator is to be used or, otherwise, generated with the first generator.

9. The computer-implemented method of claim 8, wherein the designtime entity is a pattern component that graphically depicts an entity of a visual modeling language.

10. The computer-implemented method of claim 9, wherein the pattern component is a configurable, reusable unit corresponding to a task, and having a specific semantic meaning and defined interaction behavior.

11. The computer-implemented method of claim 8, wherein generating a runtime version of the designtime entity with the second generator comprises:
   receiving designtime information related to the designtime entity; and
   generating the runtime version based on the designtime information; and the method further comprises:
   including in a runtime version of the application definition the designtime information and information about the runtime version of the designtime entity.

12. The computer-implemented method of claim 8, wherein an architecture of a modeling environment of a visual modeling program comprises a first layer defining a technical platform, a second layer defining a framework for implementing a modeling language in the technical platform, a third layer defining designtime interfaces for modeling language entities, and a fourth layer defining a layer for configuring the modeling language entities, wherein the designtime entity is implemented in the second layer.

13. A computer-implemented system including one or more processors, the computer-implemented system being operable to perform operations comprising:
   receiving input characterizing an application definition at designtime, the application definition comprising a designtime entity and a configuration of properties of the designtime entity;

determining whether the designtime entity is to be compiled by a generic generator or a specific generator, the generic generator supporting compilation of multiple types of designtime entities and the specific generator supporting compilation of a specific type of designtime entity;

receiving input characterizing the specific generator and an association of the specific generator with the designtime entity;

registering the specific generator with the generic generator;

wherein
    determining whether the designtime entity is to be compiled by the generator generator or the specific generator comprises iterating through a table of registered generators and determining whether the designtime entity is associated with the specific generator, and
    the determining is performed by the generic generator and the operations further comprise the generic generator calling the specific generator to compile the designtime entity if the specific generator is to be used; and generating a runtime version of the designtime entity, the runtime version generated with the specific generator if the specific generator is to be used or, otherwise, generated with the generic generator.

14. The computer-implemented system of claim 13, wherein the generic generator calls the specific generator to generate the runtime entity from the specific type of designtime entity.

15. The computer-implemented system of claim 13, wherein the designtime entities are pattern components that graphically depict entities of a visual modeling language and each type of designtime entity corresponds to a type of pattern component.

16. The computer-implemented system of claim 15, wherein the pattern components are configurable, reusable units corresponding to tasks, and having specific semantic meanings and defined interaction behavior.

17. The computer-implemented system of claim 13, wherein the specific generator to generate the runtime entity comprises:
    receiving designtime information related to the designtime entity; and
    generating the runtime version based on the designtime information; and
    the generic generator includes in an application the designtime information and information about the runtime version of the designtime entity.

18. The computer-implemented system of claim 13, wherein
    an architecture of a modeling environment of a visual modeling program comprises a first layer defining a technical platform, a second layer defining a framework for implementing a modeling language in the technical platform, a third layer defining designtime interfaces for modeling language entities, and a fourth layer defining a layer for configuring the modeling language entities, wherein the designtime entities are implemented in the second layer.

\* \* \* \* \*